United States Patent [19]

Yu

[11] Patent Number: 5,726,959
[45] Date of Patent: Mar. 10, 1998

[54] METHOD FOR SEARCHING A TRACK OF A COMPACT DISK DRIVE

[75] Inventor: Won-jae Yu, Suwon, Rep. of Korea

[73] Assignee: Samsung Electronics Co., Ltd., Kyungki-Do, Rep. of Korea

[21] Appl. No.: 752,227

[22] Filed: Nov. 19, 1996

[30]     Foreign Application Priority Data

Jul. 23, 1996 [KR] Rep. of Korea ............ 96-29888

[51] Int. Cl.⁶ ........................................... G11B 7/00
[52] U.S. Cl. ............................................... 369/32
[58] Field of Search ............................ 369/32, 44.27, 369/44.28, 44.29

[56]        References Cited

U.S. PATENT DOCUMENTS

| 5,117,412 | 5/1992 | Ito et al. .......................... 369/32 |
| 5,623,460 | 4/1997 | Nagasawa et al. ............... 369/32 |

*Primary Examiner*—Nabil Hindi
*Attorney, Agent, or Firm*—Sughrue, Mion, Zinn, Macpeak & Seas, PLLC

[57]        ABSTRACT

A method for accurately searching a target track of a disc in a disc drive is provided. The method includes the steps of: a) generating a reference signal having a predetermined period, b) moving a pickup across tracks from a starting point of a disc region where information is recorded to an end point thereof, c) counting the number of pulses of the reference signal generated during the movement and the number of tracks across which the pickup moves, d) dividing the counted number of tracks by the counted number of pulses of the reference signal, thereby obtaining the number of tracks per reference signal pulse, and e) searching a target track based on the number of tracks per reference signal pulse in the step d). Here, both the total number of tracks between a starting point of a program region and a starting point of a lead-out region and the number of pulses of a reference signal is obtained, and the number of tracks per reference signal pulse is obtained from the data. Then the information is used for the track search.

4 Claims, 3 Drawing Sheets

METHOD FOR SEARCHING A TRACK OF A COMPACT DISK DRIVE

BACKGROUND OF THE INVENTION

The present invention relates to a disc drive such as a compact disc read only memory (CD-ROM), and more particularly, to a method for searching a track on a disc using an optical pickup of a disc drive during a series of processes for reproducing information recorded on the disc which is mounted on the disc drive.

The CD-ROM is a mass memory medium of 680 MB from which data is read using a laser beam. An example of a CD-ROM is a compact disc used for storing music. A CD-ROM drive for driving the CD-ROM can be operated according to three interface methods, that is, an AT-BUS method, an SCSI method and an Enhanced IDE method, depending on the data transfer method used by computer hardware such as a hard disc drive.

FIGS. 1A and 1B show a general compact disc, where FIG. 1A is a plan view of a disc, and FIG. 1B is a sectional view taken along line A—A' of FIG. 1A. Referring to FIGS. 1A and 1B, a compact disc 10 consists of a plate of synthetic resins coated with aluminum which has an outside diameter of 120 mm and a thickness of 1.2 mm, and has a center portion where a guide hole 10h having a diameter of 15 mm is formed.

The disc includes a lead-in region 10a, which is also called a table of contents region, having tables of information, for example, in the case of an audio CD, the number of songs, a starting point for the music, and the total time for all songs, a program region 10b where various data are recorded, and a lead-out region 10c where a signal indicating the end of the program is recorded.

On the disc, a lot of fine grooves for storing predetermined digitized information signals, for example, audio information signals or computer information signals, are formed. The fine grooves are called pits, and a line of pits is called a track. The track 10t, as shown in FIG. 2, spirals from the center of the disc. The number of tracks is approximately 22,000, and the interval between tracks, i.e. the pitch, is usually 1.6 µm.

Meanwhile, when the above compact disc is mounted on a disc drive, a focus servo is driven in order to accurately focus a laser beam for reading a signal from the pits on the disc. Then, the laser beam is moved along the track of the disc. A sled/tracking servo is driven so that the laser beam is moved corresponding to the eccentricity of the disc based on the track position detected by an optical system, and a spindle motor drives the disk so that the rotation speed and the position (phase) thereof are controlled based on a clock signal read out from the disc, to thereby rotate the disc at a constant linear velocity.

The CD-ROM drive employs a control method which uses a frequency generator in order to control the displacement of rotations of a sled motor, and the pulse generated from the frequency generator, hereafter called a sled pulse, corresponds to the predetermined number of tracks within one period of the pulse. Accordingly, a track search, which is based on data regardless of disk type, is performed, so that the track search with respect to a target track cannot be accurately performed, which thereby delays access time.

SUMMARY OF THE INVENTION

Accordingly, it is an object of the present invention to provide a method for searching a track on a disc in a disc drive in which track search with respect to a target track on a compact disc can accurately be performed.

To accomplish the above object of the present invention, there is provided a method for searching a track on a compact disc in a disc drive, comprising the steps of: a) generating a reference signal having a predetermined period; b) moving a pickup across tracks from a starting point to an end point of a disc region where information is recorded, thereof; c) counting the number of pulses of the reference signal generated during the movement and the number of tracks across which the pickup moves; d) dividing the counted number of tracks by the counted number of pulses of the reference signal, thereby obtaining the number of tracks per reference signal pulse; and e) searching a target track based on the number of tracks per reference signal pulse in the step d).

According to the method of the present invention, both the total number of tracks between a starting point of a program region and a starting point of a lead-out region and the number of pulses of a reference signal can be obtained, and the number of tracks per reference signal pulse can be obtained from the data, and then the information is used for the track search. Accordingly, the track search with respect to a target track can accurately be performed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1A:
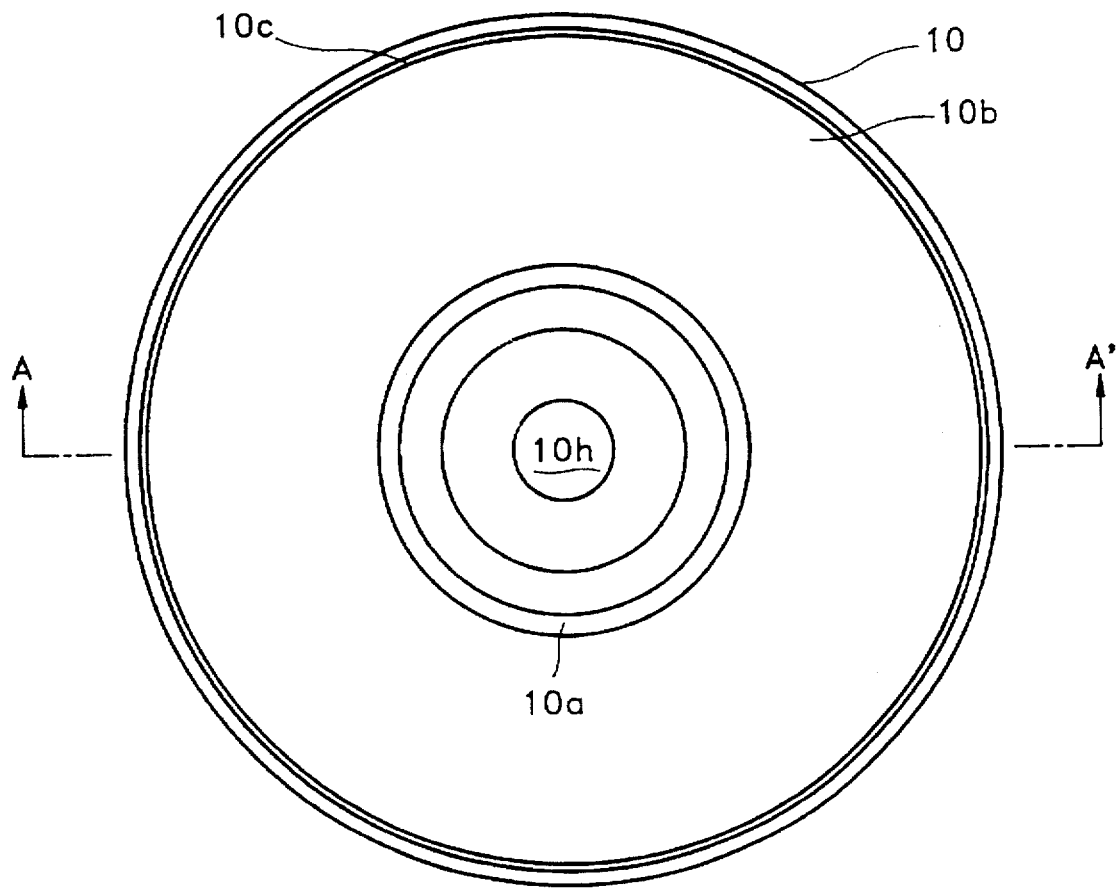
FIG. 1A is a plan view showing a general compact disc.
Figure 1B:
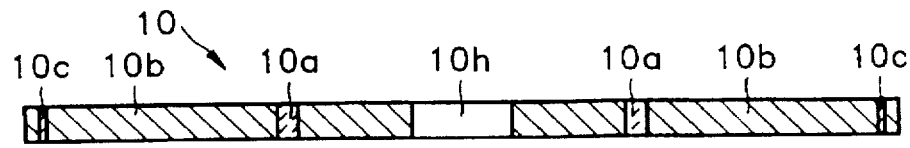
FIG. 1B is a sectional view of a compact disk taken along line A—A' of FIG. 1A.
Figure 2:
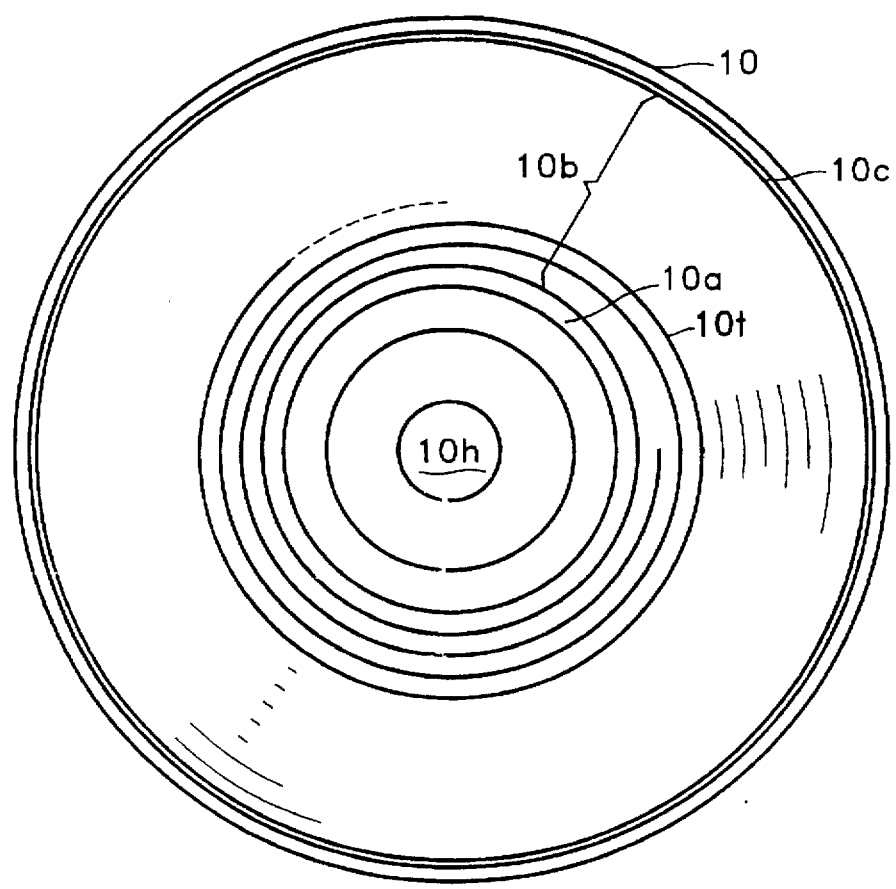
FIG. 2 is a plan view of a spiraled track on the compact disc shown in FIG. 1A.
Figure 3:
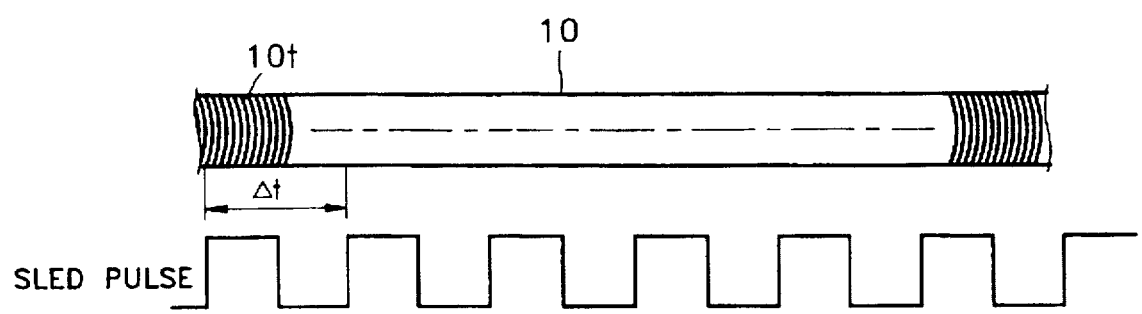
FIG. 3 is a view showing the correlation between tracks and a sled pulse of the compact disc of FIG. 1A.
Figure 4:
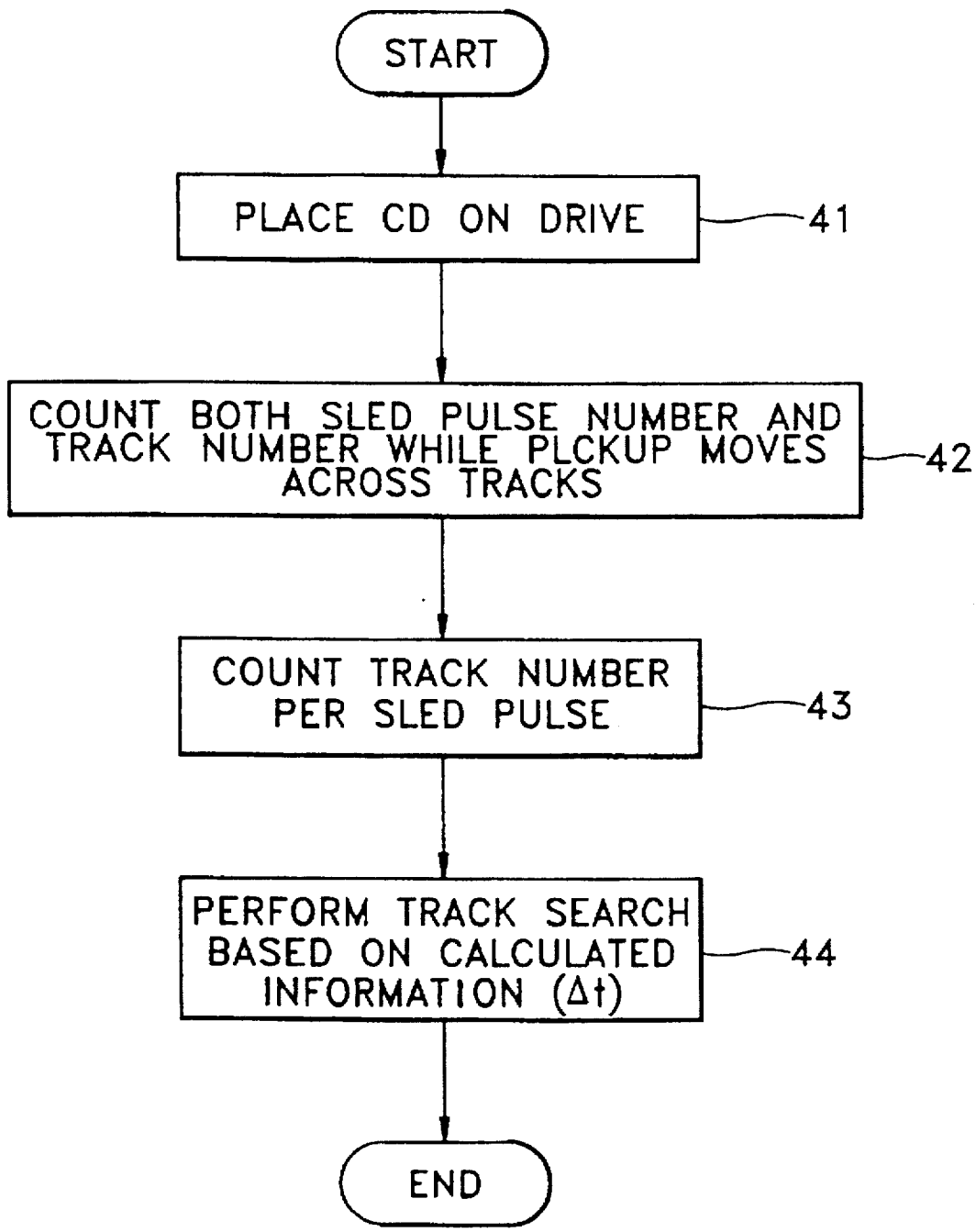
FIG. 4 is a flow chart illustrating a disc track search method according to the present invention.

Referring to FIGS. 2, 3, and 4, a compact disc 10 includes approximately 22,000 tracks 10t which are formed very densely. When the compact disc 10 is mounted on a compact disc drive (step 41), a pickup moves across the tracks from a starting point of the program region 10b (see FIGS. 1B and 2) to a starting point of the lead-out region 10c, where both the number of sled pulses and the number of tracks between the two points are counted (step 42).

Here, the number of tracks M between the two points can be expressed as follows:

$$M = K - L,$$

where reference character L indicates the number of tracks from the track starting portion of the disc to the lead-in region and reference character K indicates the number of tracks from the track starting portion of the disc to the lead-out region.

The number of tracks per sled pulse is obtained by dividing the number of tracks by the number of sled pulses (step 43). That is, when the number of tracks per sled pulse is Δt, and the number of sled pulses generated between the starting point of the lead-out region 10c and that of the program region 10b is SP, the number of tracks per sled pulse can be expressed as follows:

$$\Delta t = M/SP.$$

The track search is performed based on information of the track number Δt of a unit sled pulse (step 44). That is, when the number of tracks from the current position of a pickup to a target track is N, the number of sled pulses necessary for the track movement can be obtained by N/Δt. Here, the movement of the pickup to the target track can be accurately controlled by counting the number of sled pulses.

As described above, according to a method for searching a disc track in a disc drive of the present invention, while the pickup moves to the starting point of the lead-out region from the starting point of the program region, the number of tracks and the number of sled pulses therebetween can be obtained, and then the track number per sled pulse is obtained from that data and used to accurately perform the track search with respect to the target track.

What is claimed is:

1. A method for searching a track on a disc in a disc drive, comprising the steps of:

a) generating a reference signal having a predetermined period;

b) moving a pickup across tracks from a starting point of a disc region where information is recorded to an end point of the disc region where information is recorded;

c) counting a number of pulses of said reference signal which are generated during said moving step and a number of tracks across which said pickup moves during said moving step;

d) dividing the counted number of tracks by the counted number of pulses of said reference signal, thereby obtaining a number of tracks per reference signal pulse; and e) searching a target track based on the number of tracks per reference signal pulse obtained in said step d).

2. A method for searching a track on a disc in a disc drive according to claim 1, further comprising a step of providing said disc so that a data region of said disc is divided into a lead-in region where a table containing information regarding contents recorded on said disc is recorded, a program region where data is recorded, and a lead-out region where a signal indicating an end of a program is recorded, and wherein in said moving step the starting point of the disc region is the starting point of the program region, and the end point of said disc region is the starting point of said lead-out region.

3. A method for searching a track on a disc in a disc drive according to claim 1, wherein said disc is a compact disc.

4. A method for searching a track on a disc in a disc drive according to claim 2, wherein said disc is a compact disc.

* * * * *